United States Patent [19]
Grünewald et al.

[11] 3,710,546
[45] Jan. 16, 1973

[54] PROCESS FOR THE REMOVAL OF HYDROGEN SULFIDE AND CARBON DIOXIDE FROM FUEL GASES AND SYNTHESIS GASES

[75] Inventors: Gerhard W. Grünewald, Mainz-Mombach; Gerhard Hochgesand, Neu-Isenburg, both of Germany

[73] Assignee: Metallgesellschaft Aktiengesellschaft, Frankfurt am Main, Germany

[22] Filed: Sept. 16, 1971

[21] Appl. No.: 181,272

Related U.S. Application Data

[60] Continuation of Ser. No. 889,687, Dec. 31, 1969, abandoned, which is a division of Ser. No. 674,558, Oct. 11, 1967, Pat. No. 3,531,917.

[52] U.S. Cl. ........................................... 55/42, 55/73
[51] Int. Cl. ......................... B01d 19/00, B01d 53/14
[58] Field of Search ............. 55/42, 48, 55, 56, 73, 68

[56] References Cited

UNITED STATES PATENTS 2,863,527  12/1958  Herbert et al. ................... 55/73
3,362,133  1/1968  Kutsher et al. ................ 55/73 X Primary Examiner—Reuben Friedman
Assistant Examiner—R. W. Burks
Attorney—Burgess, Dinklage & Sprung

[57] ABSTRACT

In the process of removing $CO_2$ and H2S from fuel or synthesis gas by absorption with an organic solvent where the gas to be purified passes through an $H_2S$ absorber and then through two stages of a $CO_2$ absorber with the organic solvent being fed partially to the first and partially to the second stage of the $CO_2$ absorber and thence, in a $CO_2$ laden condition, to the $H_2S$ absorber; partially resolving the $H_2S$ and $CO_2$ rich absorbent from the $H_2S$ absorber to produce a substantially sulfurfree gas and an $H_2S$ rich liquid, regenerating the $H_2S$ rich liquid in a regenerator to produce an $H_2S$ rich gas suitable for the production of sulfur and a fully regenerated absorbent which is fed to the second stage of the $CO_2$ absorber, partially regenerating a portion of the $CO_2$ rich absorbent from the first stage of the $CO_2$ absorber by flashing, and feeding the partially regenerated absorbent to the first stage of the $CO_2$ absorber.

6 Claims, 1 Drawing Figure

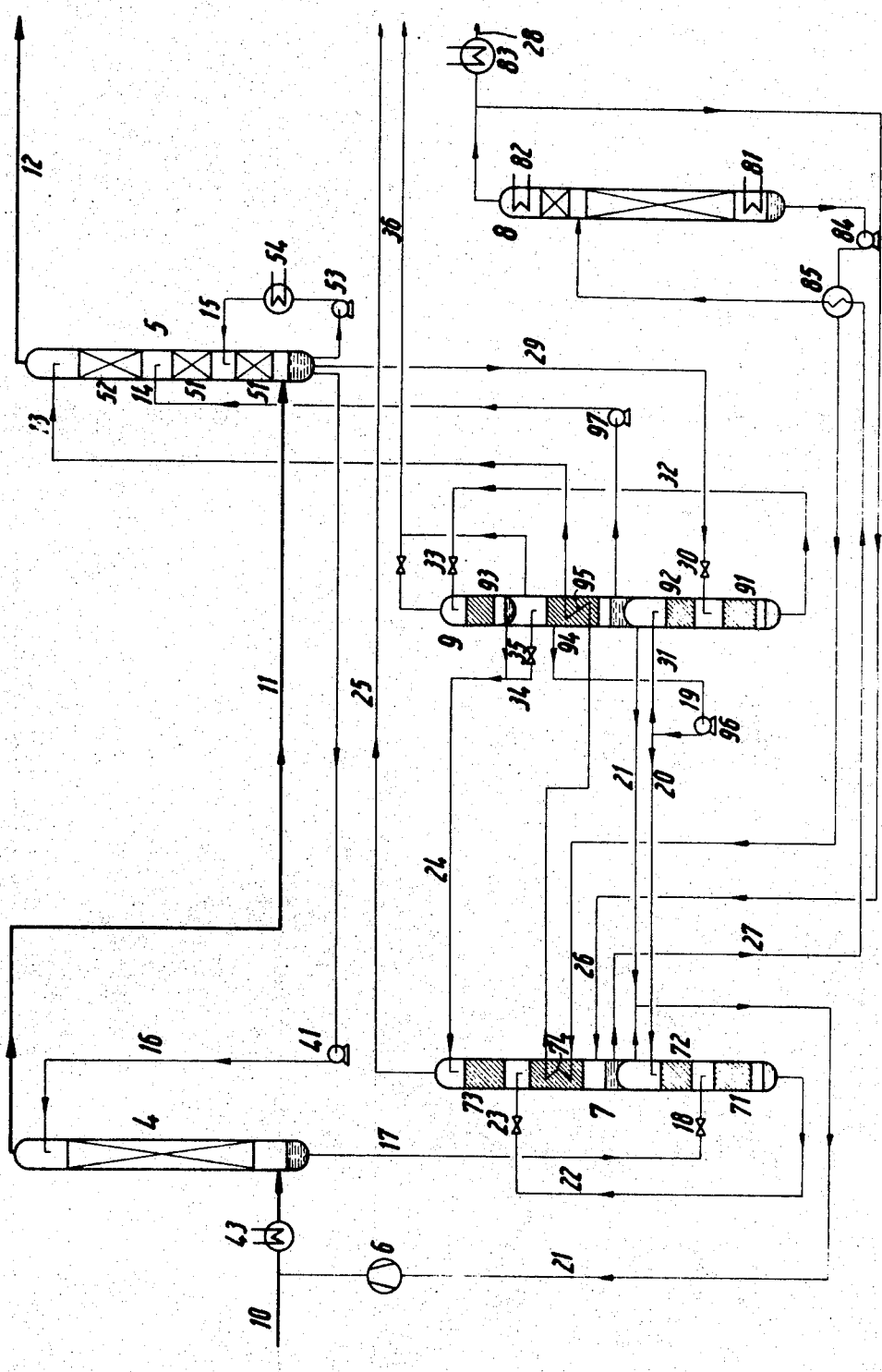

PROCESS FOR THE REMOVAL OF HYDROGEN SULFIDE AND CARBON DIOXIDE FROM FUEL GASES AND SYNTHESIS GASES

This is a continuation of application Ser. No. 889,687 filed Dec. 31, 1969 and now abandoned, which in turn is a division of application Ser. No. 674,558, filed Oct. 11, 1967 and now U.S. Pat. No. 3,531,917.

This invention relates to the removal of $CO_2$ and $H_2S$ from gases, particularly fuel and synthesis gas. It more specifically refers to a particular mode of operating such absorption process and to special steps and techniques for the regeneration of absorbent and for producing sulfur rich and substantially sulfur free gaseous products.

The processes for the purification of commercial fuel gases and synthesis gases, such as are, for example, produced from solid or liquid fuels, or recovered as natural gas, or obtained through a conversion of gaseous fuels, are primarily for removing the acid components, the sulfur compounds, and the unsaturated hydrocarbons from the crude gas. The major part by volume of these impurities usually consists of carbon dioxide and hydrogen sulfide.

Numerous processes have been disclosed for solving the problem of purifying such gases. Absorption processes particularly have gained commercial significance, in accordance with which the gas is subjected to a one- or multi-step scrubbing operation with liquid absorbents, which, depending on their dissolving power, absorb the impurities from the gas either simultaneously or successively, are thereafter regenerated through removal of the absorbed gaseous constituents, and the regenerated absorbents are then recycled to the gas scrubbing operation. These absorption processes may roughly be divided into two groups: i.e., those processes utilizing chemically active absorbents and those using physically active absorbents.

The chemical type scrubbing processes often operate with aqueous solutions of inorganic or organic bases or alkali salts of weak inorganic or organic acids. These processes are subject to the stoichiometric laws; the amount of steam used for regenerating is in most instances proportional to the amount of acid components removed by scrubbing; and therefore these processes are primarily suitable for the removal of acid impurities present in the crude gas in low to moderate concentrations, as well as in cases where inexpensive steam is readily available.

In cases, however, where large quantities of gas having a high acid content are to be purified, physical scrubbing processes utilizing organic solvents as absorbents have recently been employed with increasing frequency. The simplest and probably oldest physical gas scrubbing process absorbs $CO_2$ by scrubbing with water under pressure. In contrast to the processes employing chemically active absorbents, in processes using physically active absorbents, the amount of scrubbing agent necessary for the removal of an individual component from a given amount of crude gas depends, aside from the temperature-variable solubility coefficient, only on the total pressure under which the scrubbing process is carried out. In such a process, the solubility of a gas in the scrubbing liquid increases with a drop in temperature and a rise in pressure. Accordingly, regeneration has often been effected by a pressure drop (flashing) and/or by an increase in temperature.

The advantages of the physical scrubbing processes with respect to capacity and energy requirements become increasingly apparent as the pressure of the gas to be purified is increased, since with an increase in gas pressure, less scrubbing liquid, on the one hand, is required for purification, and on the other hand, an increasing part of the regeneration process may be effected by flashing of the scrubbing medium.

The physical scrubbing processes are, as a rule, performed at ambient or below ambient temperatures, preferably at temperatures of $-40°$ and below. The absorption temperature is selected in accordance with the volatility of the absorbent. Even in the known low-temperature processes which are carried out with the use of low-boiling absorbents such as methanol or acetone, the absorption temperature may lie above 0°C if the crude gas is under a correspondingly high pressure, i.e., approximately 60 ata (atmospheres absolute pressure) and higher.

In one of these known processes, which is carried out with the use of methanol as the absorbent at temperatures below $-10°C$ and at pressures in excess of 2 atmospheres above atmospheric pressure, a crude gas, for example, recovered through the gasification of coal obtained under a pressure of 20 atmospheres above atmospheric pressure and containing approximately 4 percent by volume sulfur compounds and about 30 percent by volume $CO_2$ is cooled down below 0°C and then scrubbed in a single step to give a gas having the quality of synthesis gas. The throughput of this process is within the range of between about 50,000 to 150,000 standard cubic meters per hour. In this scrubbing process, which may also be carried out in a multi-step operation, not only $CO_2$ and $H_2S$ but also the organic sulfur compounds are removed, while hydrocarbons, particularly the unsaturated hydrocarbons known as resin precursors, are eliminated from the crude gas together with the condensate obtained upon cooling.

One disadvantage of the physical as well as some of the chemical scrubbing processes resides in the fact that the scrubbing liquid does not have a very high differential selectivity for $H_2S$ with respect to $CO_2$. If, as is frequently the case, the $H_2S$ content of the crude gas is considerably lower than the $CO_2$ content, then, with a low selectivity absorbent, the $H_2S$ removed by scrubbing is obtained highly diluted with $CO_2$. This is so even if the gas is purified in a two-step operation, in which the first step is designed solely for the removal of the $H_2S$. This is significant inasmuch as it is generally desired to recover the sulfur components removed from the crude gas in the most concentrated form possible in order to facilitate their useful further processing for the production of elementary sulfur or sulfuric acid. It is also desirable to recover the $CO_2$ removed from the gas in the purest form possible in order to release the same without danger into the environment as an exhaust gas. With even higher purity requirements, it is often possible to use the $CO_2$ for synthesis purposes, as, for instance, the synthesis of urea.

A further disadvantage of the use of physically dissolving scrubbing liquids is that their selectivity, even with respect to the useful components of the crude gas, particularly with respect to hydrogen and carbon monoxide, and possibly methane and ethane, is limited. Together with the removal of the undesirable components of the crude gas, there is always simultaneously absorbed part, even if usually only a very small part, of these useful components which may be recovered by initially, after the scrubbing liquid leaves the absorption tower, only slightly flashing the liquid so that only those useful components which are difficultly soluble in the scrubbing fluid will escape at this stage. These can then be recompressed into the purified gas. However, the energy consumption for this recompression is increased by the fact that, even with the highest possible recovery of these useful components, it is additionally necessary to recompress a larger or smaller quantity of acid gases which are also released when the scrubbing liquid is partly flashed. If, for instance, it is desired to recompress 90 percent of the simultaneously absorbed useful gases, then, in the usual arrangements, only 20 percent of the gas to be recompressed consists of these useful gases, and 80 percent consists of the acid gas components.

It has been found that both of these difficulties can be overcome to a large extent by the use of re-absorbers, i.e., apparatus for the re-absorption of gas components which have already been dissolved and subsequently released by a decrease in total pressure or partial pressure. Thus, $H_2S$-rich exhaust gases may be obtained in the purification of crude gases having a low $H_2S/CO_2$ ratio, particularly 1:30 and less, by means of physically acting organic solvents. If the gas purification is carried out in two successive steps using the same scrubbing liquid, the first step serves for the removal of $H_2S$ (and, if desired, COS and other sulfur components) and the second step serves for the removal of $CO_2$, while the $H_2S$ and $CO_2$ laden scrubbing liquid exiting from the $H_2S$ absorber is subjected to a material exchange with a material countercurrent flow to increase the concentration of the $H_2S$. For this purpose, the laden scrubbing liquid leaving the bottom of the $H_2S$ scrubbing tower is initially pre-flashed in order to recover the useful components, and is then fed to a countercurrent tower which acts in the manner of a rectifying column and operates under a medium pressure, i.e., between the crude gas pressure and atmospheric pressure.

The pre-flashed scrubbing liquid is fed into the countercurrent tower at an intermediate point thereof and then flows down countercurrent to a rising $H_2S$-rich gas. During this step, the scrubbing liquid absorbs further $H_2S$, whereas part of the $CO_2$ contained in solution in the scrubbing liquid is stripped out. The scrubbing liquid having an increased $H_2S$ content is conducted from the bottom of the countercurrent column via a heat exchanger to a regenerating tower where it is completely degasified by boiling in the per se known manner. Part of the $H_2S$-rich exhaust gas thus driven off is therefore available as product, and part is fed back to the bottom of the countercurrent column as countercurrent gas in order to increase the concentration of $H_2S$ in the laden absorbent. After the material exchange in the lower part of the countercurrent column, the exhaust gas is scrubbed in the upper part of the countercurrent column with $H_2S$-free absorbent liquid introduced at the top of the column, so that the product coming overhead is practically sulfur-free, whereas the sulfur components are substantially all in the laden absorbent passing from the countercurrent column to the regenerating tower because of the concentration taking place in the lower portion of the countercurrent column.

If the sulfur components are highly enriched in the lower portion of the countercurrent column, the scrubbing liquid will be highly laden therewith due to the high solubility of these sulfur compounds in the absorbent. Thus, a relatively large amount of $H_2S$ rich recycle gas is required to be fed to the bottom of the countercurrent column. For this reason, it is in many cases desired to raise the operating temperature in the lower portion of the countercurrent tower, for example by means of a built-in or adjoining heat exchanger which is suitable heated with steam and/or warm, regenerated scrubbing liquid. In this manner, the dissolving power of the scrubbing liquid will be reduced with respect to all gas components, so that not only is the loading of the scrubbing liquid accordingly reduced, but the amount of recycle gas necessary for the enrichment also becomes smaller. The heat exchanger may be eliminated wholly or partially by disconnecting or throttling a dephlegmator in the top of the regenerating tower thereby feeding the recycle gas into the countercurrent column at a high temperature while it contains a correspondingly high proportion of absorbent vapor.

In the manner described above, the $H_2S$-$CO_2$-mixture contained in the scrubbing liquid leaving the $H_2S$ absorber is released upon regeneration into two streams: i.e., a sulfur-free, $CO_2$-containing exhaust gas discharged at the top of the countercurrent column, and an $H_2S$-rich exhaust gas discharged at the top of the regenerating tower. Since removal of the sulfur components from the crude gas is completed in the $H_2S$ absorber, the $CO_2$ absorber serves the sole purpose of removing the $CO_2$ still contained in the crude gas. Regeneration of the laden absorbent from the $CO_2$ absorber is carried out in known manner by flashing and, where high purity requirements prevail, also with the aid of a stripping gas employed in the last flashing stage. The exhaust gas obtained from $CO_2$ absorber overhead is likewise free of sulfur.

The countercurrent enriching tower may be particularly conveniently incorporated in the overall process if purification of the gas is effected in a special arrangement which will be briefly described as follows:

If purification of the crude gas is effected in a two-absorber operation, the two absorbers being entirely separate from each other, the scrubbing liquid, which is fed to the first stage of the $H_2S$ absorber in completely regenerated form, removes, together with the sulfur components, also a considerable proportion of any $CO_2$ contained in the crude gas. Thus, in the $H_2S$ absorber, not only an accordingly large amount of absorption heat is taken up by the scrubbing fluid, but also the capacity of the scrubbing liquid to dissolve $CO_2$ is inadequately utilized. It has been found that both shortcomings may be eliminated by interconnecting both the $H_2S$ and the $CO_2$ absorbers in such a manner that a part of the scrubbing liquid from the $CO_2$ absorber is completely regenerated and is then initially employed as the absorbent for $CO_2$ in the second $CO_2$ scrubbing stage. A portion of the $CO_2$ laden absorbent exiting from the $CO_2$ absorber is not directly regenerated but is used to remove $H_2S$ in the $H_2S$ absorber. In this manner, the scrubbing liquid which is introduced into the $H_2S$ absorption tower is already saturated with $CO_2$ and thus its temperature will only be slightly increased in the $H_2S$ absorber since the amount of sulfur containing materials being absorbed is only very small due to the usually rather low concentration of sulfur in the crude gas. The amount of scrubbing liquid cycled through the two absorbers is adjusted so as to effect substantially total $H_2S$ removal in the $H_2S$ absorber. Thus, the amount is not sufficient to effect $CO_2$ removal in the $H_2S$ absorption stage. Therefore, the above-described large absorbent cycle is reinforced and made possible by providing an additional, smaller scrubbing liquid cycle, including only the lower section of the $CO_2$ absorber stage. This lower section is only designed to effect a coarse removal of $CO_2$ in the lower portion of the $CO_2$ absorption tower and thus requires a correspondingly coarse regeneration.

While the first-mentioned scrubbing liquid stream of the large absorbent cycle is conducted from the bottom of the $CO_2$ absorber to the top of the $H_2S$ absorber the remainder of the scrubbing liquid exiting the bottom of the $CO_2$ absorber is used in the small cycle and is coarse regenerated, merely by flashing or, if desired, additionally with the aid of a stripping gas in a last flashing stage, and is then recycled to the lower section first stage of the $CO_2$ absorber. Above this point of introduction, the $CO_2$ is removed from the pressurized feed gas, except for the desired residual content which may be as low as from 10–50 ppm, by the fully regenerated, completely degassified large cycle absorbent.

In analogous manner, the $H_2S$ free scrubbing liquid introduced at the top of the countercurrent enriching column is suitably not completely regenerated, but rather has already been used in the $CO_2$ absorber and is then, after leaving the $CO_2$-absorption tower, flashed to the pressure of the countercurrent enriching column.

The re-absorber provided for the reduction of the recompression work is, in each case, suitable mounted on that flash chamber from which the recompression gas is to be withdrawn. While the laden scrubbing agent withdrawn from the $H_2S$ absorber is partly flashed in said flash chamber to release the gases which are to be recompressed, the rising flashed-off gases are freed in the upper portion from the acid ballast gases, with the use of scrubbing liquid, before they are conducted to the recompressor for purposes of reincorporation into the pressurized feed gas. This type of re-absorption has already been used but it has always used completely regenerated absorbent for the re-absorption. In the instant case, it is, however, not necessary to obtain a recompression gas which has been completely freed from all acid components, but rather it is intended to merely reduce the volume of this gas stream as much as possible in order to decrease the energy required for compression. It is therefore entirely sufficient to lower the $CO_2$ content from, for example, an initial 80 percent to 20 percent. To accomplish this, it is, however, not necessary to use a completely regenerated absorbent for the re-absorption, such regeneration being rather expensive, but rather it is possible to use an only partially regenerated absorbent. If, for instance the first flashing stage from which the gases are to be recompressed operates at a pressure of 8 atmospheres absolute, then the absorbent used for the re-absorption may be one which has been only partially regenerated by flashing to atmospheric pressure.

In accordance with the foregoing, the invention relates to a process for the removal of primarily $H_2S$ and $CO_2$ from fuel gases and synthesis gases by means of a two-stage scrubbing with an organic solvent, for example, methanol, acetone, xylene and/or toluene, or the like, including an $H_2S$ absorber in which the sulfur components are removed and are then reconcentrated in a countercurrent column, so that they may be subjected to further processing for the production of elementary sulfur or sulfur acid; and a $CO_2$ absorber comprising a first and a second stage wherein $CO_2$ is removed from the feed gas and is then released in a sulfur-free condition. The countercurrent column operates in such a manner that the partly flashed $H_2S$ rich absorbent is introduced and further flashed at an intermediary point in the countercurrent column so that the flashed vapor is contacted with a countercurrent stream of $H_2S$-enriched absorbent in the lower portion of said column, whereby the absorbent is further enriched with $H_2S$, while in the upper portion of the tower, the sulfur components contained in the gas which ascends from the lower portion are scrubbed back by a partial stream of sulfur-free scrubbing liquid.

In accordance with the invention, both the absorbent required in the $H_2S$ absorber for the removal of $H_2S$ from the crude gas and the absorbent necessary for the re-absorption of $H_2S$ in the countercurrent-enriching column are withdrawn from the $CO_2$ absorber, after the absorbent has removed $CO_2$ from the crude gas and thus has become substantially saturated with $CO_2$. The partial stream of laden absorbent required for the re-absorption of $H_2S$ is initially, after leaving the $CO_2$-absorption tower, adjusted to the operating pressure prevailing in the enriching countercurrent column by means of flashing.

The flashed-off gases returned via a compressor to the feed gas from the first flashing stages of the regeneration in order to aid in the recovery of useful gases therefrom are suitable previously freed from their $CO_2$ ballast either in a re-absorber or in two reabsorbers connected in parallel, whereby, in accordance with the invention, an only partially regenerated scrubbing agent is used. Alternately, the useful gases enriched by the re-absorption of the $CO_2$ may be discharged as a fuel gas of high caloric value without recompression.

The drawing shows, by way of example, a flow diagram suitable for carrying out the process according to the invention.

The apparatus essentially comprises an $H_2S$ absorption tower 4; a $CO_2$ absorption tower 5 including a coarse first scrubbing zone 51 and a fine second scrubbing zone 52; a first flash tower 7 for the flashing of $H_2S$-laden absorbent (suitably methanol); a regenerating tower 8 for the hot regeneration of the $H_2S$-laden absorbent including a reboiler 81, a dephlegmator 82 and a condenser 83; and a second flash tower 9 for the regeneration of the $CO_2$-laden absorbent including a lower flash chamber 91 having a re-absorption zone 92 and further including an upper flash chamber 93 and an intermediate flash chamber 94. The first flash tower 7 contains a lower flash chamber 71, a re-absorption zone 72, and an upper flash chamber 73 constructed as a countercurrent-enriching stage (countercurrent tower).

The gas to be purified, after having been cooled down to a temperature of −10° and freed from condensate, is conducted through a conduit 10 into a final cooler 43 where it is cooled to approximately −30° by indirect heat exchange. Subsequently, the gas flows through the absorber 4 for the removal of the $H_2S$ and the other sulfur compounds.

In conduit 11, the desulfurized feed gas flows to the $CO_2$-absorber 5, ascending therein countercurrent to the cold, trickling-down absorbent which is supplied through conduits 13, 14 and 15.

The purified gas leaves the absorber 5 at the top and is conducted through a conduit 12 for further processing.

The absorbent required for the removal of the sulfur compounds is withdrawn from the bottom of the $CO_2$-absorber 5 and is supplied by a pump 41 through conduit 16 to the top of the $H_2S$ absorber 4. The $H_2S$ and $CO_2$ laden absorbent flows from the bottom of the $H_2S$ absorber 4 through a conduit 17, having a pressure-relief device 18 therein, into the flash chamber 71.

In the flash chamber 71, the laden absorbent is partially flashed to release the low-solubility useful gas components which are dissolved therein, i.e., mainly $H_2$ and CO. In the re-absorption zone 72, partially regenerated absorbent is supplied by a pump 96 from the intermediate flash chamber 94 through conduits 19 and 20 to the re-absorption zone 72 and is used to remove the major portion of the $CO_2$ contained in the gases flashed-off in this partial flashing. The useful gas is compressed by a compressor 6 together with the gas originating from the corresponding stage (92) of the $CO_2$ second flash tower 9 and is recycled into the crude gas through a conduit 21.

The absorbent utilized for the re-absorption flows through the flash chamber 71 and, together with the absorbent charged to said flash chamber 71 is flashed through conduit 22, having a pressure-relief device 23, into the countercurrent column 73 at an intermediate point thereof. At the top of the countercurrent column 73, partially regenerated absorbent from the upper flashing stage 93 is introduced through a conduit 24 which serves to remove the sulfur compounds contained in the exhaust gases, so that the overhead product flowing off through a conduit 25 is practically free of sulfur. Part of the $H_2S$-rich gas absorbent vapor mixture driven off in the regenerating tower 8 is recycled through a conduit 26 into the lower part of the countercurrent tower 73. The absorbent liquid trickling countercurrent to the recycle gas takes up $H_2S$ from the recycle gas, thereby $CO_2$ is flashed off, and is heated as a result of the cooling of the warm recycle gas entering the column and due to the condensation of the methanol vapors contained therein. In order to reduce the amount of the recycle gas, this absorbent is further heated in a heat exchanger 74. The absorbent flows from the bottom of the countercurrent column through the conduit 27 into the regenerating tower 8 which contains the reboiler 81 and the dephlegmator 82. The $H_2S$-rich gas driven off from the regenerator 8 is conducted partly as recycle gas through conduit 26 into the countercurrent column 73 as noted above, and partly as exhaust gas through a condenser 83 and a conduit 28 into a plant designed for further processing thereof, i.e., into a sulphur producing plant.

A pump 84 supplies completely regenerated absorbent liquid from the bottom of the regenerating tower 8 via heat exchangers 85, 74 and 95, where the absorbent liquid is cooled down, and through a conduit 13 to the top of the second stage of the $CO_2$-absorber 5.

The amount of absorbent which is to be charged to the top of the countercurrent column 73 and the amount of absorbent which is to be regenerated merely by flashing are withdrawn from the bottom of the first stage of the $CO_2$-absorber 5 via a conduit 29. This $CO_2$ containing absorbent flows through a pressure-relief device 30 into the lower flash chamber 91, where, by means of a first partial flashing, substantially all of the $H_2$ and CO dissolved in the absorbent is flashed off together with $CO_2$.

In the lower re-absorption zone 92 arranged above the lower flashing stage 91, most of the $CO_2$ is removed from the first partially flashed-off gas, for which removal partially regenerated absorbent is used. Absorbent is moved by the pump 96 from the flashing stage 94 and released through a conduit 19 onto the lower absorption zone 92. A recycle stream passes through the conduit 32. The remaining gas flows to the compressor 6 through a conduit 21. The absorbent used for the re-absorption of $CO_2$ flows into the lower flashing stage 91 and together with the absorbent charged to that stage is, under further flashing, conducted into an upper flash chamber 93 via the conduit 32 having a pressure-relief device 33. From the bottom of this upper flash chamber 93, part of the absorbent flows through a conduit 24 to the top of the countercurrent column 73, while the remaining absorbent flows through a conduit 34, having a pressure-relief device 35, into an intermediate flash chamber 94 and is further flashed therein. In flash chamber 94, the absorbent is heated in a heat exchanger 94 by indirect heat exchange with regenerated absorbent from the regenerator 8, whereby further degasification occurs.

From the bottom of intermediate flash-chamber 94, a pump 97 transports the flash-regenerated absorbent through a conduit 14 to the top of the first $CO_2$ absorber stage 51. The pure $CO_2$ exhaust gases released in the flash chambers 93 and 94 are discharged from the system through a conduit 36.

In order to compensate for refrigeration losses, the $CO_2$ absorber 5 may be provided with a cooling cycle. A pump 53 sucks the necessary amount of absorbent from the bottom of the $CO_2$ absorber 5 and transports the same through an ammonia-evaporator 54, which supplies the necessary refrigeration, and then via a conduit 15 to a suitable point in the first $CO_2$ absorber stage 51.

In order to simplify the flow diagram, heat exchangers serving the recovery of refrigeration are not shown.

QUANTITATIVE EXAMPLE

It is assumed that the gas to be purified, having already been cooled to below 0°C and separated from the removed condensate, enters the H₂S absorber of the system with the following composition:

| | |
|---|---|
| CO₂ | 30% |
| H₂S | 1% |
| H₂ | 53% |
| CO | 14% |
| Balance (CH₄ + N₂) | 2% |

It may be assumed that the amount of gas fed to the inlet of the plant is 100,000 standard cubic meters per hour at a pressure of 30 atmospheres absolute. The absorbent used is methanol.

The crude gas fed through a conduit 10 is cooled down to about −30°C in the heat exchanger system 43 by indirect heat exchange with product gases and exhaust gases as well as with evaporated NH₃, and after separation from the removed condensate conducted to the H₂S absorber 4 for removal of the sulfur components. The desulfurized gas, from which CO₂ has not yet been removed, leaves the H₂S absorber tower 4 at approximately the same temperature and is conducted through a conduit 11 to the CO₂-absorber 5. In the lower part (first stage) 51 of the CO₂ absorber, approximately 85 percent of the CO₂-content of the gas is removed, while in the upper part (second stage) 52 the remaining 15 percent is washed out.

Approximately 69,000 standard cubic meters per hour of gas are discharged from the CO₂ absorber 5 at a pressure of approximately 28.2 atmospheres absolute and a temperature of approximately −48°C, the gas having the following composition:

| | |
|---|---|
| H₂ | approx. 77% |
| CO | approx. 20% |
| Balance (CH₄ + N₂) | approx. 3% |

For the removal of the sulfur components performed in the H₂S absorber 4, approximately 70 cubic meters per hour of methanol are necessary which are withdrawn from the bottom of the CO₂ absorber 5 at a temperature of about −32°C. In the lower flash chamber 71, the methanol draining from the H₂S absorber 4 is flashed to about 8 atmospheres absolute. During this step, approximately 1,000 standard cubic meters per hour of gas are flashed off, of which approximately 700 standard cubic meters per hour are removed again in the lower re-absorption zone 72 with the use of 15 cubic meters per hour of methanol. The remaining 300 standard cubic meters per hour together with the corresponding gas from the CO₂ flashing stage 91/92 are returned into the crude gas by the compressor 6.

In the middle part of the countercurrent column 73, the 85 cubic meters per hour of methanol fed from lower flash chamber 71 are flashed to approximately 1.8 atmospheres absolute. The top of the countercurrent column is charged with approximately 70 cubic meters per hour of methanol at a temperature of −58°C.

Both streams of absorbent (together approximately 155 cubic meters per hour) are heated in the lower part of the countercurrent column 73 by means of about 5,000 standard cubic meters per hour of recycle gas and about 1,000 standard cubic meters per hour of methanol vapor as well as by the heat exchanger 74 and are then pumped through the heat exchanger 85 into the regenerating tower 8 which operates at a pressure of approximately 2 atmospheres absolute.

Approximately 155 cubic meters per hour of regenerated absorbent flows through the heat exchangers 85, 74 and 95, wherein the absorbent is cooled down to approximately −50°C at the top of the CO₂-absorber 5.

From the countercurrent column 73, approximately 15,000 standard cubic meters per hour of virtually sulfur-free exhaust gases are discharged at a temperature of approximately −55°C and a pressure of approximately 1.3 atmospheres absolute.

40 percent of the approximately 7,500 standard cubic meters per hour of gas driven off in the regenerating tower 8 consists of H₂S, 5,000 standard cubic meters per hour are used as recycle gas, the the remaining 2,500 standard cubic meters per hour flows through the condenser 83 where the methanol vapors contained in the gas are condensed out before passing it to a plant designed for further processing.

From the bottom of the CO₂-absorber 5, approximately 130 cubic meters per hour of methanol flow to the CO₂ flash tower 9. In the lower flashing stage 91 of this tower, which operates at a pressure of approximately 8 atmospheres absolute, about 1,500 standard cubic meters per hour of gas is flashed off, of which approximately 1,200 standard cubic meters per hour are absorbed again in the reabsorption zone 92 with the use of approximately 20 cubic meters per hour of methanol.

The remaining approximately 300 standard cubic meters per hour of flashed-off gases are returned, via the compressor 6, into the crude gas together with the 300 standard cubic meters per hour of gas from the H₂S flash-chamber 71/72.

Methanol, which has been flashed to about 1.3 atmospheres absolute, enters the upper flash chamber 93 at the rate of approximately 150 cubic meters per hour. Approximately 70 cubic meters per hour of this methanol flows from the upper chamber 93 to the top of the countercurrent column 73, while the remaining 80 cubic meters per hour flow to the intermediate flash chamber 94 which operates at approximately atmospheric pressure. Approximately 35 cubic meters per hour of methanol are withdrawn as a side stream from the top of the intermediate flash chamber 94 and charged to the reabsorption zones 72 and 92. The remaining 45 cubic meters per hour of methanol flows through the heat exchanger 95 where it is heated, thus releasing more gas, and is subsequently pumped to the top of the first stage CO₂ absorber 51. A total stream of approximately 13,500 standard cubic meters per hour of virtually sulfur-free exhaust gas is discharged jointly from flash chambers 93 and 94.

We claim:

1. In the process of removing H₂S and CO₂ from feed gas comprising passing said gas countercurrent to an organic absorbent wherein said gas passes first through an H₂S absorber countercurrent to CO₂ laden absorbent and then successively through first and second CO₂ absorption stages in which first stage said gas is passed countercurrent to a partially regenerated stream of said absorbent and in which second stage the gas from said first stage is passed countercurrent to a fully regenerated stream of said absorbent, obtaining a $CO_2$ and $H_2S$ laden absorbent from said $H_2S$ absorber, obtaining a product gas overhead from said second stage $CO_2$ absorption which is substantially $CO_2$ and $H_2S$ free and obtaining $CO_2$ laden absorbent liquid from said first stage $CO_2$ absorption a portion of which is fed to said $H_2S$ absorber as aforesaid and a portion of which is fed to a second flasher; the improvement, permitting obtaining a first exhaust gas which is substantially sulfur free but high in $CO_2$ and a second exhaust gas which is rich in sulfur which comprises feeding said $CO_2$ and $H_2S$ laden absorbent from said $H_2S$ absorber to a first flasher; partially flashing said $CO_2$ and $H_2S$ laden absorbent in said first flasher to produce $H_2S$ laden liquid absorbent; further flashing said $H_2S$ laden absorbent to a countercurrent column; partially regenerating said absorbent liquid in said second flasher to produce a substantially sulfur free absorbent; passing $H_2S$-containing flash gas evolved from said $H_2S$-laden adsorbent by said further flashing in said countercurrent column countercurrent to said substantially sulfur free absorbent liquid while simultaneously feeding to said countercurrent system said $H_2S$ laden gas whereby evolving an $H_2S$ rich liquid absorbent and a substantially sulfur free overhead gas; and substantially completely regenerating said $H_2S$ rich liquid absorbent by heating whereby producing an $H_2S$ rich gas overhead, a portion of which is recycled as said $H_2S$ enriched gas, and producing a substantially fully regenerated absorbent liquid which is fed to said second stage $CO_2$ absorption.

2. The improved process claimed in claim 1 wherein part of the $CO_2$ laden absorbent from the bottom of the first stage $CO_2$ absorption is fed to the top of the $H_2S$ absorber and part of it is partially flashed and the liquid product of such partial flashing is fed to the top of said first stage $CO_2$ absorption.

3. The improved process claimed in claim 2 wherein said substantially sulfur free absorbent for the partial reabsorbtion of the gas from said further flashing of said $H_2S$ laden absorbent in said countercurrent column is a part of the liquid product obtained by partial flashing of the $CO_2$ laden absorbent from the bottom of said first $CO_2$ absorption stage.

4. The improved process claimed in claim 1 wherein the useful fraction of gas absorbed in the laden absorbent from said $H_2S$ absorber is freed by preflashing, scrubbed, recompressed and recycled to said feed gas.

5. The improved process claimed in claim 1 wherein said countercurrent column is indirectly heated by completely regenerated absorbent.

6. The improved process claimed in claim 1 wherein said countercurrent column is directly heated by warm $H_2S$ enriched gas containing absorbent vapor from said regeneration.

* * * * *